(12) United States Patent
Lee et al.

(10) Patent No.: US 9,268,395 B2
(45) Date of Patent: Feb. 23, 2016

(54) HIERARCHICAL POWER MANAGEMENT CIRCUIT, POWER MANAGEMENT METHOD USING THE SAME, AND SYSTEM ON CHIP INCLUDING THE HIERARCHICAL POWER MANAGEMENT CIRCUIT

(75) Inventors: Jae Gon Lee, Yongin-si (KR); Bong Il Park, Seongnam-si (KR); Moo Kyung Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 631 days.

(21) Appl. No.: 13/233,841

(22) Filed: Sep. 15, 2011

(65) Prior Publication Data
US 2012/0072743 A1     Mar. 22, 2012

(30) Foreign Application Priority Data
Sep. 20, 2010     (KR) .................. 10-2010-0092487

(51) Int. Cl.
*G06F 1/32*     (2006.01)
(52) U.S. Cl.
CPC ........... *G06F 1/3287* (2013.01); *Y02B 60/1282* (2013.01)
(58) Field of Classification Search
None
See application file for complete search history.

(56) References Cited

U.S. PATENT DOCUMENTS

| 6,802,014 | B1 * | 10/2004 | Suurballe | 713/300 |
| 2003/0133337 | A1 * | 7/2003 | Yamada et al. | 365/200 |
| 2005/0064829 | A1 * | 3/2005 | Kang et al. | 455/127.1 |
| 2008/0178031 | A1 * | 7/2008 | Kim | 713/330 |

FOREIGN PATENT DOCUMENTS

| CN | 1433180 A | 7/2003 |
| CN | 1871869 A | 11/2006 |
| JP | 2006-054723 | 2/2006 |
| JP | 2006-180586 | 7/2006 |
| KR | 1020000006981 A | 2/2000 |
| KR | 1020050054692 A | 6/2005 |

OTHER PUBLICATIONS

Chinese Office Action Corresponding to Chinese Patent Application No. 201110279321.6, Date Mailed: Aug. 20, 2014; Foreign Text, 13 Pages.

* cited by examiner

*Primary Examiner* — Paul Yanchus, III
(74) *Attorney, Agent, or Firm* — Myers Bigel Sibley & Sajovec, PA (57) ABSTRACT

A hierarchical power management circuit includes N power management circuits respectively included in N power domains each including at least one intellectual property (IP), wherein N is a natural number greater than one. The i-th ($1 < i < N$) power management circuit from among the N power management circuits manages supply of power to an (i+1)th power domain from among the N power domains in response to a power management request signal output from a first power management circuit from among the N power management circuits.

19 Claims, 5 Drawing Sheets

HIERARCHICAL POWER MANAGEMENT CIRCUIT, POWER MANAGEMENT METHOD USING THE SAME, AND SYSTEM ON CHIP INCLUDING THE HIERARCHICAL POWER MANAGEMENT CIRCUIT

CROSS-REFERENCE TO RELATED APPLICATIONS

This application claims priority under 35 U.S.C. §119(a) from Korean Patent Application No, 10-2010-0092487 filed on Sep. 20, 2010, the disclosure of which is hereby incorporated by reference in its entirety.

BACKGROUND OF THE INVENTION

Example embodiments relate to a power management circuit, and, more particularly, to hierarchical power management circuits that are distributed in a plurality of power domains and are capable of managing supply of power to each of the power domains and the operations of intellectual properties (IPs) respectively formed in the power domains, a power managing method using the same, and a system on chip (SoC) including the hierarchical power management circuits.

A mobile SoC may need to reduce power consumption. In general, the mobile SoC includes a power management circuit built therein.

The power management circuit reduces power consumption of the mobile SoC by using a method of stopping an operation of a circuit installed in the mobile SoC or blocking power provided to the mobile SoC. However, because power is always provided to the power management circuit, power consumption of the power management circuit increases when the power management circuit has a complex structure.

SUMMARY OF THE INVENTION

The present inventive concept provides hierarchical power management circuits distributed and installed in a plurality of power domains, respectively, so as to reduce power consumption of the hierarchical power management circuits, a power managing method using the same, and a system on chip (SoC) including the hierarchical power management circuits.

According to an aspect of the present inventive concept, there is provided a hierarchical power management circuit comprising N power management circuits respectively installed in N power domains each comprising at least one intellectual property (IP), wherein N is a natural number greater than one, wherein an i-th ($1<i<N$) power management circuit from among the N power management circuits manages supply of power to an (i+1)th power domain from among the N power domains in response to a power management request signal output from a first power management circuit from among the N power management circuits.

The i-th power management circuit manages an operation of the at least one IP included in the i-th power domain in response to an operation management request signal output from the first power management circuit. The first power management circuit and the i-th power management circuit transmit and receive data to and from each other by using an asynchronous interface. The asynchronous interface uses a handshake method.

According to another aspect of the present inventive concept, there is provided a hierarchical power managing method comprising receiving, by a power management circuit included in an i-th power domain from among N power domains each comprising a power management circuit, a power management request signal from a power management circuit included in a first power domain from among the N power domains, wherein N is a natural number greater than one, and i is greater than 1 and less than N; and managing, by the power management circuit installed in the i-th power domain, supply of power to an (i+1)th power domain from among the N power domains in response to the power management request signal.

The hierarchical power managing method further comprises managing, by the power management circuit included in the i-th power domain, an operation of an IP included in the i-th power domain in response to an operation management request signal output from the power management circuit included in the first power domain.

The power management circuit included in the first power domain and the power management circuit installed in the i-th power domain transmit and receive data to and from each other by using, an asynchronous interface. The asynchronous interface uses a handshake method.

According to another aspect of the present invention, there is provided an SoC comprising N power domains each comprising at least one IP, wherein N is a natural number greater than one; and N power management circuits installed in the N power domains, respectively, wherein an i-th ($1<i<N$) power management circuit from among the N power management circuits manages supply of power to an (i+1)th power domain from among the N power domains in response to a power management request signal output from a first power management circuit from among the N power management circuits.

According to another aspect of the present invention, there is provided a mobile device comprising the SoC and a power supply, which supplies power to the SoC.

BRIEF DESCRIPTION OF THE DRAWINGS

Exemplary embodiments of the present invention will be more clearly understood from the following detailed description taken in conjunction with the accompanying drawings in which.

DETAILED DESCRIPTION

Exemplary embodiments now will be described more fully hereinafter with reference to the accompanying drawings. The exemplary embodiments may, however, be embodied in many different forms and should not be construed as limited to the embodiments set forth herein. Rather, these embodiments are provided so that this disclosure will be thorough and complete. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
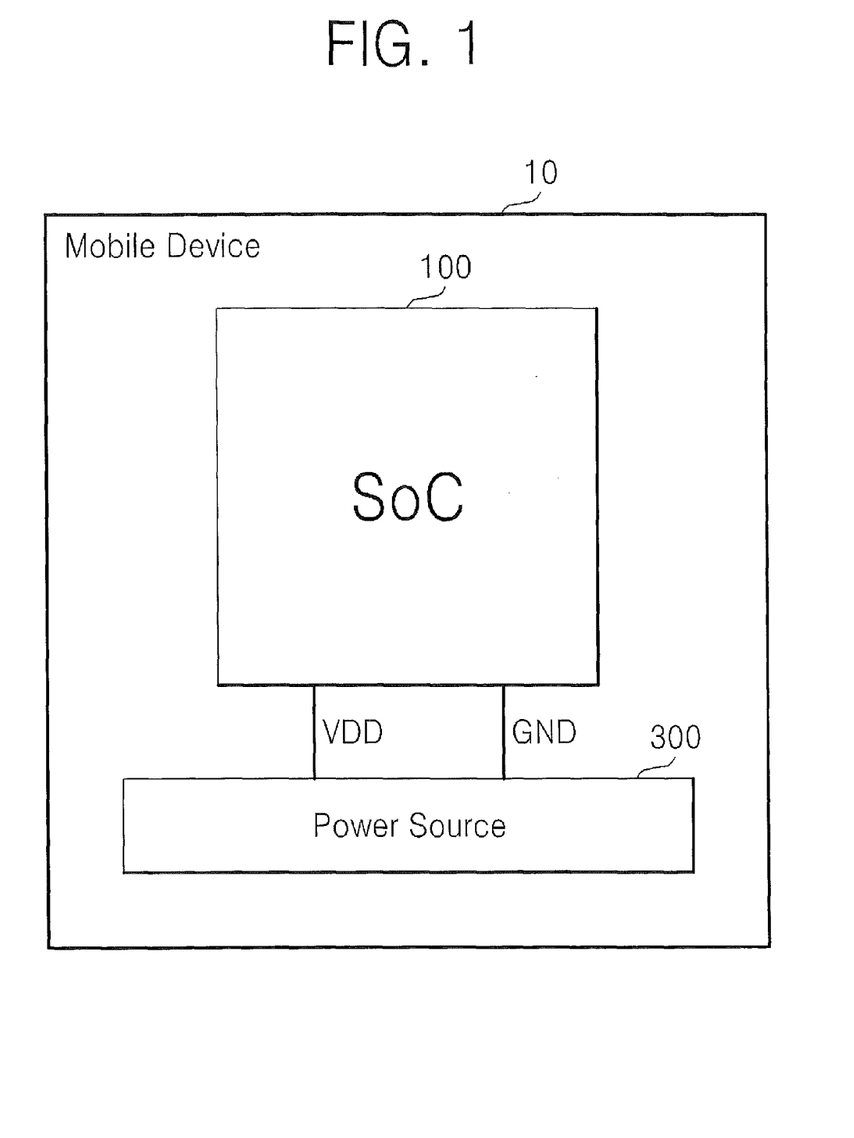
FIG. 1 is a block diagram of a mobile device including a system on chip (SoC) having a hierarchical power management circuit, according to an exemplary embodiment of the present inventive concept.
Figure 2:
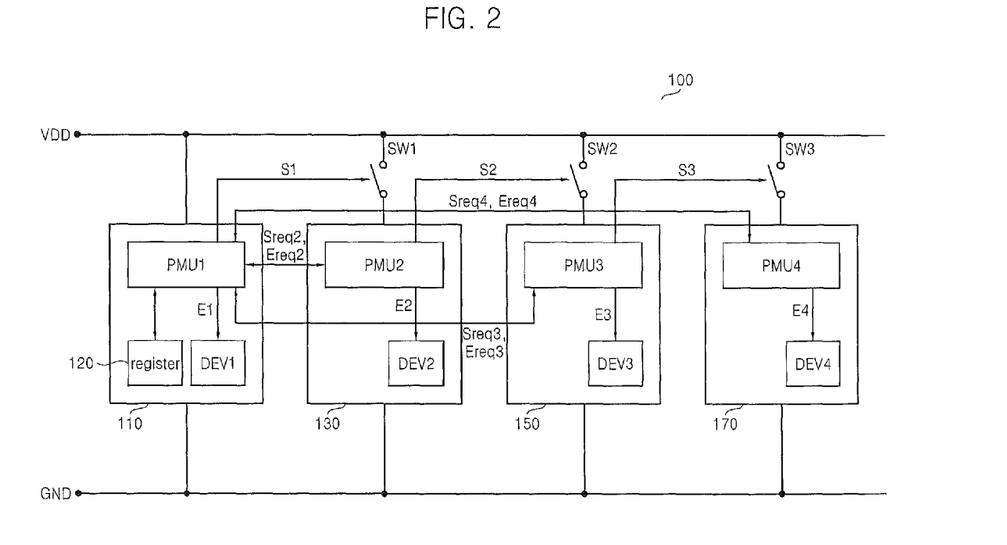
FIG. 2 is an internal block diagram of the SoC having the hierarchical power management circuit illustrated in FIG. 1, according to an exemplary embodiment of the present inventive concept.

FIG. 1 is a block diagram of a mobile device 10 including a system on chip (SoC) 100 having a hierarchical power management circuit, according to an exemplary embodiment of the present inventive concept, and FIG. 2 is an internal block diagram of the SoC 100 having the hierarchical power management circuit illustrated in FIG. 1, according to an exemplary embodiment of the present inventive concept.

Referring to FIGS. 1 and 2, the mobile device 10 includes the SoC 100 and a power source 300. The mobile device 10 encompasses a device capable of being implemented by using a data processing device, such as a mobile phone, a tablet personal computer (PC), a net-book, an e-reader, a personal digital assistant (PDA), a portable multimedia player (PMP), an MP3 player, an MP4 player, or portable device.

The power source 300 plays a role of supplying power VDD to the SoC 100, and may be implemented by using a chargeable battery built in the mobile device 10. The SoC 100 includes a plurality of power domains, namely, first, second, third, and fourth power domains 110, 130, 150 and 170, that are connected between a power line supplying the power VDD and a ground GND.

Here, a power domain denotes a domain including at least one intellectual property (IP) that shares an identical power line. The IP may denote a function block designed to have an independent function during designing of an integrated circuit, for example, the IP may denote a semiconductor design module.

For example, the IP may be implemented by using a central processing unit (CPU), a memory, a memory controller, a camera for acquiring image data, driver, audio module, video module, an image signal processor for processing the image data acquired by the camera, or the like.

Although the four power domains, namely, the first, second, third, and fourth power domains 110, 130, 150 and 170, are illustrated in FIG. 2 for convenience of explanation, more than or less than four power domains may be included according to the design specification.

The first power domain 110 among the first, second, third, and fourth power domains 110, 130, 150, and 170 is an uppermost power domain to which power is always supplied during an operation of the SoC 100.

Each of the second power domain 130, the third power domain 150, and the fourth power domain 170 is a lower power domain of the first power domain 110, and denotes a power domain to which power may be supplied according to a determination or operation of a first power management circuit PMU1 included in the first power domain 110.

In other words, "upper" and "lower" in an upper power domain and a lower power domain are relative concepts, and the upper power domain and the lower power domain are distinguished from each other according to which one is able to manage the power supply.

For example, when a second power management circuit PMU2 within the second power domain 130 manages supply of power to the third power domain 150, the second power domain 130 is an upper power domain of the third power domain 150 and the third power domain 150 is a lower power domain of the second power domain 130.

Referring back to FIG. 2, the first, second, third, and fourth power domains 110, 130, 150, and 170 have a hierarchical structure because they are upper or lower power domains.

The hierarchical structure denotes a structure in which the first, second, third, and fourth power management circuits PMU1, PMU2, PMU3 and PMU4 are distributed and installed in the first, second, third, and fourth power domains 110, 130, 150, and 170, respectively, and a power management circuit installed in an upper power domain, for example, the first power management circuit PMU1, manages supply of power to a lower power domain, for example, the second power domain 130.

How to distribute and arrange the first, second, third, and fourth power management circuits PMU1, PMU2, PMU3, and PMU4 in the first, second, third, and fourth power domains 110, 130, 150, and 170 may be determined according to which function each of the first, second, third, and fourth power management circuits PMU1, PMU2, PMU3, and PMU4 performs.

The respective functions of the first, second, third, and fourth power management circuits PMU1, PMU2, PMU3 and PMU4 may be classified into two types. The two types are a function of managing supply of power to a lower power domain (function 1), and a function of managing an operation of at least one IP existing in the same or lower power domain (function 2).

For example, a function of turning on/off supply of power to a processor or a function of determining whether to supply or not supply power to a specific power domain corresponds to the function 1, and a function of determining whether to run or stop a clock generator or whether to operate an internal bus existing in the SoC 100 corresponds to the function 2.

Accordingly, the first, second, third, and fourth power management circuits PMU1, PMU2, PMU3 and PMU4 form a hierarchical structure and may be distributed and arranged in the first, second, third, and fourth power domains 110, 130, 150, and 170, respectively, while satisfying the following conditions to perform the two functions, namely, the functions 1 and 2.

First, a power management circuit that performs the function 1 needs to be installed or embodied in an upper power domain of a power domain that undergoes power management. Second, a power management circuit that performs the function 2 needs to be installed in a power domain identical to or upper relative to a power domain that includes an IP that undergoes operation management. A hierarchical power managing method according to an exemplary embodiment of the present inventive concept of FIG. 2 will now be described based on the above description.

The first power domain 110 includes the first power management circuit PMU1, a first IP DEV1, and a register 120. The second, third, and fourth power domains 130, 150, and 170 include the second, third, and fourth power management circuits PMU2, PMU3, and PMU4, respectively, and second, third, and fourth IPs DEV2, DEV3, and DEV4, respectively.

Although each of the first, second, third, and fourth power domains 110, 130, 150 and 170 includes one IP in FIG. 2 for convenience of explanation, each of the first, second, third, and fourth power domains 110, 130, 150 and 170 may include a plurality of IPs according to the design specification.

The first power domain 110 is a domain to which power is always supplied during an operation of the SoC 100, and thus is an upper power domain of the second power domain 130. The first power management circuit PMU1 installed or laid out in the first power domain 100 may manage supply of power to the second power domain 130 or an operation of the first IP DEV1 formed in the first power domain 110 in response to an externally input command, and may transmit second, third, and fourth power management request signals Sreq2, Sreq3 and Sreq4 and second, third, and fourth operation management request signals Ereq2, Ereq3 and Ereq4, respectively, to the second, third, and fourth power management circuits PMU2, PMU3 and PMU4.

The externally input command may denote a command received from an IP formed in the first power domain 110, for example, the first IP DEV1, denote a command received from a CPU installed in the first, second, third, or fourth power domain 110, 130, 150, or 170, or denote a change of a specific signal level which is sensed from the first power domain 110.

The first power management circuit PMU1 may transmit the second power management request signal Sreq2 or the second operation management request signal Ereq2 to the second power management circuit PMU2, the third power management request signal Sreq3 or the third operation management request signal Ereq3 to the third power management circuit PMU3, and the fourth operation management request signal Ereq4 to the fourth power management circuit PMU4 according to the externally input command. At this time, the first power management circuit PMU1 refers to information stored in the register 120 to respond to the externally input command.

The register 120 may store information indicating the internal status of the SoC 100, for example, whether power is being supplied to each of the second, third, and fourth power domains 130, 150, and 170 or whether each of the first, second, third, and fourth IPs DEV1, DEV2, DEV3, and DEV4 installed in the first, second, third, and fourth power domains 110, 130, 150, and 170 is operating. Thus, the first power management circuit PMU1 may refer to the register 120 to respond to the externally input command and may perform a necessary operation. According to an embodiment of the present invention, the first IP DEV1 may be a real time clock or an input/output (I/O) pad.

Although the register 120 and the first power management circuit PMU1 are separated from each other in FIG. 2, the register 120 may be included in the first power management circuit PMU1 according to the design specification.

The second power domain 130 includes the second power management circuit PMU2 and the second IP DEV2.

The second power domain 130 is an upper power domain of the third power domain 150, and thus the second power management circuit PMU2 manages supply of power to the third power domain 150 in response to the second power management request signal Sreq2 output from the first power management circuit PMU1. In other words, the second power management circuit PMU2 supplies a second switching signal S2 to a second switch SW2 connected between the third power domain 150 and the power line supplying the power VDD to manage an on/off operation of the second switch SW2.

The second power management circuit PMU2 manages an operation of the second IP DEV2 formed in the second power domain 130 in response to the second operation management request signal Ereq2 output from the first power management circuit PMU1. In other words, the second power management circuit PMU2 may manage the operation of the second IP DEV2 by transmitting a second operation management signal E2 to the second IP DEV2. According to an embodiment of the inventive concept, the second IP DEV2 may be a peripheral circuit, for example, a timer or a watchdog timer.

The third power domain 150 includes the third power management circuit PMU3 and the third IP DEV3. The third power domain 150 is an upper power domain of the fourth power domain 170, and thus the third power management circuit PMU3 manages supply of power to the fourth power domain 170 in response to the third power management request signal Sreq3 output from the first power management circuit PMU1.

In other words, the third power management circuit PMU3 supplies a third switching signal S3 to a third switch SW3 connected between the fourth power domain 170 and the power line supplying the power VDD to manage an on/off operation of the third switch SW3. The third power management circuit PMU3 also manages an operation of the third IP DEV3 formed in the third power domain 150 in response to the third operation management request signal Ereq3 output from the first power management circuit PMU1. In other words, the third power management circuit PMU3 manages the operation of the third IP DEV3 by transmitting a third operation management signal E3 to the third IP DEV3.

According to an embodiment of the present inventive concept, the third IP DEV3 may be a display driver, a camera module, an audio codec, a moving image accelerator, or a CPU.

The fourth power domain 170 includes the fourth power management circuit PMU4 and the fourth IP DEV4.

The fourth power management circuit PMU4 manages an operation of the fourth IP DEV4 formed in the fourth power domain 170 in response to the fourth operation management request signal Ereq4 output from the first power management circuit PMU1. In other words, the fourth power management circuit PMU4 manages the operation of the fourth IP DEV4 by transmitting a fourth operation management signal E4 to the fourth IP DEV4.

Although not illustrated in FIG. 2, when the fourth power domain 170 has a lower power domain, similar to the description of the first, second, and third power domains 110, 130, and 150, the fourth power management circuit PMU4 may control supply of power to the lower power domain in response to the fourth power management request signal Sreq4 output from the first power management circuit PMU1.

Because the first, second, third, and fourth power domains 110, 130, 150, and 170 are physically separated from one another, the first, second, third, and fourth power domains 110, 130, 150, and 170 may use different types of logic cells.

Accordingly, circuits or logic formed in different power domains, for example, power management circuits or IPs, may transmit and receive data to and from one another by using an asynchronous interface. The asynchronous interface may denote hardware for performing asynchronous data communications, or may denote a functional or structural combination of the hardware and a software for driving the hardware.

For example, the asynchronous interface may denote a logical or functional unit of a program code and/or a hardware resource for allowing the program code to be performed. In other words, the asynchronous interface does not necessarily denote a physically connected memory, which stores program code or does not denote one type of hardware.

Although not illustrated in FIG. 2, the asynchronous interface may be formed in a circuit formed in each of the first, second, third, and fourth power domains 110, 130, 150, and 170, for example, in each of the first, second, third, and fourth power management circuits PMU1, PMU2, PMU3, and PMU4 or each of the first, second, third, and fourth IPs DEV1, DEV2, DEV3, and DEV4.

Accordingly, the first, second, third, and fourth power management circuits PMU1, PMU2, PMU3, and PMU4 or the first, second, third, and fourth IPs DEV1, DEV2, DEV3, and DEV4 may transmit and receive data to and from one another by using the asynchronous interface, respectively. For example, the first power management circuit PMU1 formed in the first power domain 110 may transmit and receive data to and from the third power management circuit PMU3 or the third IP DEV3 installed or laid out in the third power domain 150, by using the asynchronous interface.

According to an embodiment of the present inventive concept, the asynchronous interface may use a request-acknowledge handshake method.

Accordingly, the register 120 may store, in real time, information indicating the internal status of the SoC 100, for example, whether power is being supplied to each of the second, third, and fourth power domains 130, 150, and 170 or whether each of the first, second, third, and fourth IPs DEV1, DEV2, DEV3, and DEV4 installed in the first, second, third, and fourth power domains 110, 130, 150, and 170 is operating by using the request-acknowledge handshake method.

Figure 3:
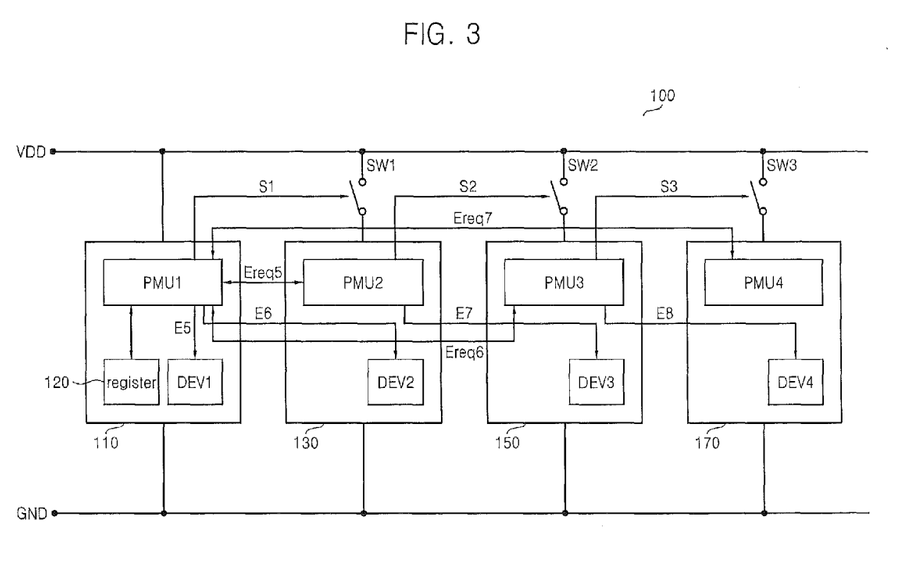
FIG. 3 is an internal block diagram of the SoC having the hierarchical power management circuit illustrated in FIG. 1, according to another exemplary embodiment of the present inventive concept.

FIG. 3 is an internal block diagram of the SoC 100 having the hierarchical power management circuit illustrated in FIG. 1, according to another exemplary embodiment of the present inventive concept. Because the respective structures of the first, second, third, and fourth power domains 110, 130, 150, and 170 and a data transceiving unit formed between the first, second, third, and fourth power domains 110, 130, 150, and 170 in the SoC 100 of FIG. 3 are substantially the same as those described above with reference to FIGS. 1 and 2, a detailed description thereof will be omitted.

An operation managing method according to another embodiment of the present inventive concept will now be described with reference to FIG. 3. It is assumed that the first, second, and third switches SW1, SW2, and SW3 connected between the second, third, and fourth power domains 130, 150, and 170 and the power line supplying the power VDD are all turned on.

The first power management circuit PMU1 manages an operation of the second IP DEV2 by providing the second IP DEV2 formed in the second power domain 130 with a fifth operation management signal E5. The second power management circuit PMU2 manages an operation of the third IP DEV3 formed in the third power domain 150 in response to a fifth operation management request signal Ereq5 received from the first power management circuit PMU1. Also, the second power management circuit PMU2 manages the operation of the third IP DEV3 by transmitting a seventh operation management signal E7 to the third IP DEV3.

The third power management circuit PMU3 manages an operation of the fourth IP DEV4 formed in the fourth power domain 170 in response to a sixth operation management request signal Ereq6 received from the first power management circuit PMU1. Also, the third power management circuit PMU3 manages the operation of the fourth IP DEV4 by transmitting an eighth operation management signal E8 to the fourth IP DEV4.

Although not illustrated in FIG. 3, when the fourth power domain 170 has a lower power domain, similar to the description of the first, second, and third power domains 110, 130, and 150, the fourth power management circuit PMU4 may manage an operation of an IP formed in the lower power domain in response to a seventh operation management request signal Ereq7 received from the first power management circuit PMU1.

Figure 4:
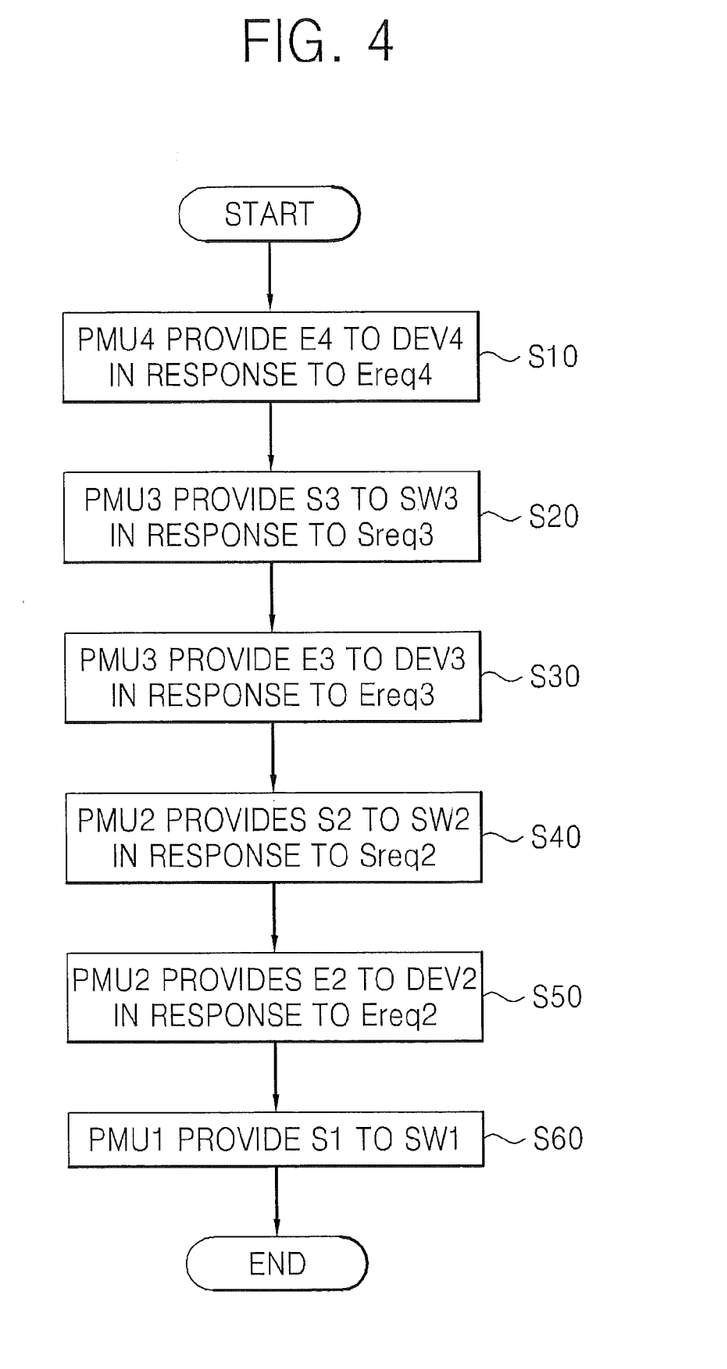
FIG. 4 is a flowchart of a power managing method according to an exemplary embodiment of the present inventive concept.

FIG. 4 is a flowchart of a power managing method according to an exemplary embodiment of the present inventive concept. FIG. 4 will now be described on the premise that the SoC 100 is in a normal mode, for example, the first, second, and third switches SW1, SW2 and SW3 are all turned on and provide power to all of the first, second, third, and fourth power domains 110, 130, 150 and 170.

Referring to FIGS. 1, 2, and 4, in the normal mode, the first power management circuit PMU1 transmits the fourth operation management request signal Ereq4, which indicates stoppage of the operation of the fourth IP DEV4, to the fourth power management circuit PMU4, and the fourth power management circuit PMU4 provides the fourth operation management signal E4 to the fourth IP DEV4 in response to the fourth operation management request signal Ereq4, in operation S10.

Next, the first power management circuit PMU1 transmits the third power management request signal Sreq3, which indicates turning-off of power to the fourth power domain 170, to the third power management circuit PMU3, and the third power management circuit PMU3 provides the third switching signal S3 to the third switch SW3 in response to the third power management request signal Sreq3, in operation S20. Thus, power is not provided to only the fourth power domain 170 from among the first, second, third, and fourth power domains 110, 130, 150, and 170. This state is referred to as a first sleep mode.

In the first sleep mode, the first power management circuit PMU1 transmits the third operation management request signal Ereq3, which indicates stoppage of the operation of the third IP DEV3, to the third power management circuit PMU3, and the third power management circuit PMU3 provides the third operation management signal E3 to the third IP DEV3 in response to the third operation management request signal Ereq3, in operation S30.

Next, the first power management circuit PMU1 transmits the second power management request signal Sreq2, which indicates turning-off of power to the third power domain 150, to the second power management circuit PMU2, and the second power management circuit PMU2 provides the second switching signal S2 to the second switch SW2 in response to the second power management request signal Sreq2, in operation 540.

Thus, power is not provided to the third and fourth power domains 150 and 170 from among the first, second, third, and fourth power domains 110, 130, 150, and 170. This state is referred to as a second sleep mode.

In the second sleep mode, the first power management circuit PMU1 transmits the second operation management request signal Ereq2, which indicates stoppage of the operation of the second IP DEV2, to the second power management circuit PMU2, and the second power management circuit PMU2 provides the second operation management signal E2 to the second IP DEV2 in response to the second operation management request signal Ereq2, in operation S50.

Next, the first power management circuit PMU1 provides the first switching signal S1 to the first switch SW1, in operation S60. Thus, power is provided to only the first power domain 110 from among the first, second, third, and fourth power domains 110, 130, 150, and 110. This state is referred to as a maximum sleep mode.

Although only the power managing method in which the normal mode is converted into the maximum sleep mode is illustrated in FIG. 4, a power managing method in which the maximum sleep mode is converted into the normal mode is substantially the inverse of the former power managing method, and thus a detailed description thereof will be omitted.

Figure 5:
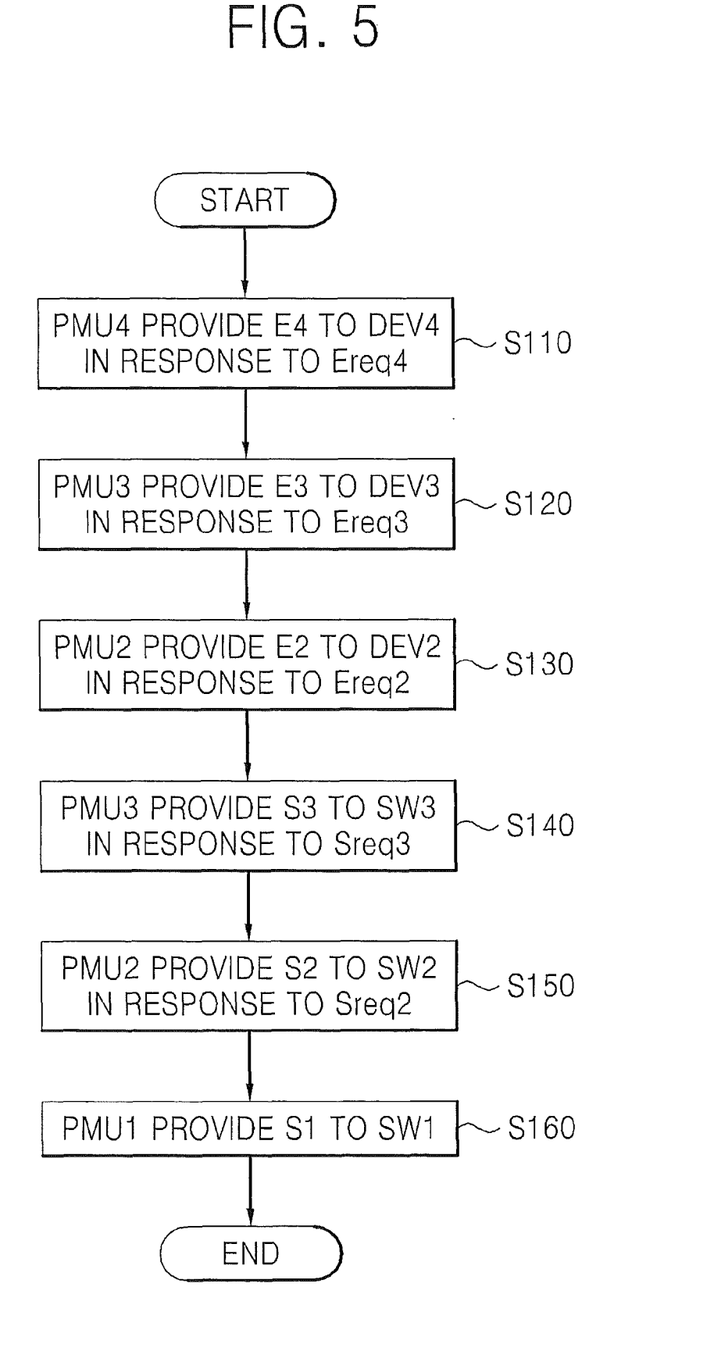
FIG. 5 is a flowchart of a power managing method according to another exemplary embodiment of the present inventive concept.

FIG. 5 is a flowchart of a power managing method according to another exemplary embodiment of the present inventive concept. The power managing method of FIG. 5 will now be described on the premise that the SoC 100 is in the normal mode described with reference to FIG. 4.

Referring to FIGS. 1, 2, and 5, in the normal mode, the first power management circuit PMU1 transmits the fourth operation management request signal Ereq4, which indicates stoppage of the operation of the fourth IP DEV4, to the fourth power management circuit PMU4, and the fourth power management circuit PMU4 provides the fourth operation management signal E4 to the fourth IP DEV4 in response to the fourth operation management request signal Ereq4, in operation S110.

Next, the first power management circuit PMU1 transmits the third operation management request signal Ereq3, which indicates stoppage of the operation of the third IP DEV3, to the third power management circuit PMU3, and the third power management circuit PMU3 provides the third operation management signal E3 to the third IP DEV3 in response to the third operation management request signal Ereq3, in operation S120. Next, the first power management circuit PMU1 transmits the second operation management request signal Ereq2, which indicates stoppage of the operation of the second IP DEV2, to the second power management circuit PMU2, and the second power management circuit PMU2 provides the second operation management signal E2 to the second IP DEV2 in response to the second operation management request signal Ereq2, in operation 5130.

Next, the first power management circuit PMU1 transmits the third power management request signal Sreq3, which indicates turning-off power to the fourth power domain 170, to the third power management circuit PMU3, and the third power management circuit PMU3 provides the third switching signal S3 to the third switch SW3 in response to the third power management request signal Sreq3, in operation S140.

Next, the first power management circuit PMU1 transmits the second power management request signal Sreq2, which indicates turning-off power to the third power domain 150, to the second power management circuit PMU2, and the second power management circuit PMU2 provides the second switching signal S2 to the second switch SW2 in response to the second power management request signal Sreq2, in operation S150, Next, the first power management circuit PMU1 provides the first switching signal S1 to the first switch SW1, in operation S160.

In a hierarchical power management circuit, a power managing method using the hierarchical power management circuit, and a SoC including the hierarchical power management circuit, power management circuits are respectively distributed and arranged in a plurality of power domains and are capable of managing supply of power to each of the power domains and the operations of IPs respectively formed in the power domains so that power consumption of the power management circuits may be reduced.

While the present invention has been particularly shown and described with reference to exemplary embodiments thereof, it will be understood that various changes in form and details may be made therein without departing from the spirit and scope of the following claims.

What is claimed is:

1. A hierarchical power management circuit, comprising:
N power management circuits respectively included in N power domains each comprising at least one intellectual property (IP), wherein N is a natural number greater than three,
wherein an i-th ($1<i<N$) power management circuit from among the N power management circuits manages supply of power to an (i+1)th power domain from among the N power domains in response to a power management request signal output from a first power management circuit from among the N power management circuits and directly received by the i-th power management circuit from among the N power management circuits,
wherein the first management circuit directly communicates with each of the remaining power management circuits among the N power management circuits.

2. The hierarchical power management circuit of claim 1, wherein the i-th power management circuit manages an operation of the at least one IP included in the i-th power domain in response an operation management request signal output from the first power management circuit.

3. The hierarchical power management circuit of claim 1, wherein the first power management circuit and the i-th power management circuit transmit and receive data to and from each other by using an asynchronous interface.

4. The hierarchical power management circuit of claim 3, wherein the asynchronous interface uses a handshake method.

5. A system on chip (SoC) comprising:
N power domains each comprising at least one IP, wherein N is a natural number greater than three; and
N power management circuits included in the N power domains, respectively,
wherein an i-th ($1<i<N$) power management circuit from among the N power management circuits manages supply of power to an (i+1)th power domain from among the N power domains in response to a power management request signal output from a first power management circuit from among the N power management circuits and directly received by the i-th power management circuit from among the N power management circuits, wherein the first power management circuit directly communicates with each of the remaining power management circuits among the N power management circuits.

6. The SoC of claim 5, wherein the i-th power management circuit manages an operation of the at least one IP included in the i-th power domain in response to an operation management request signal output from the first power management circuit.

7. The SoC of claim 6, wherein the first power management circuit and the i-th power management circuit transmit and receive data to and from each other by using an asynchronous interface.

8. The SoC of claim 7, wherein the asynchronous interface uses a handshake method.

9. A mobile device comprising:
the SoC of claim 5; and
wherein the power supply supplies power to the SoC.

10. The mobile device of claim 9, wherein the i-th power management circuit manages an operation of the at least one IP included in the i-th power domain in response to an operation management request signal output from the first power management circuit.

11. The mobile device of claim 10, wherein the first power management circuit and the i-th power management circuit transmit and receive data to and from each other by using an asynchronous interface.

12. A hierarchical power management circuit, comprising:
N power management circuits respectively included in N power domains each comprising at least one intellectual property (IP), wherein N is a natural number greater than three,
wherein an i-th ($1<i<N$) power management circuit from among the N power management circuits manages an operation of the at least one IP included in an (i+1)th power domain from among the N power domains in response to an operation management request signal output from a first power management circuit from among the N power management circuits and directly received by the i-th power management circuit from among the N power management circuits,
wherein the first power management circuit directly communicates with each of the remaining power management circuits among the N power management circuits.

13. The hierarchical power management circuit of claim 12, wherein the i-th power management circuit manages supply of power to the (i+1)th power domain from among the N power domains in response to a power management request signal output from the first power management circuit.

14. The hierarchical power management circuit of claim 12, wherein the first power management circuit and the i-th power management circuit transmit and receive data to and from each other by using an asynchronous interface.

15. The hierarchical power management circuit of claim 14, wherein the asynchronous interface uses a handshake method.

16. The hierarchical power management circuit of claim 12, wherein the first power management circuit comprises a register that holds at least one of first status information indicating whether power is supplied to the power domains other than the power domain that includes the first power management circuit and second status information indicating whether each of the at least one IP is operating.

17. The hierarchical power management circuit of claim 1, wherein the first power management circuit is directly connected to a power supply and the N-1 power management circuits other than the first power management circuit are connected to the power supply by N-1 switches, respectively.

18. The SoC of claim 5, wherein the first power management circuit is directly connected to a power supply and the N-1 power management circuits other than the first power management circuit are connected to the power supply by N-1 switches, respectively.

19. The hierarchical power management circuit of claim 12, wherein the first power management circuit is directly connected to a power supply and the N-1 power management circuits other than the first power management circuit are connected to the power supply by N-1 switches, respectively.

* * * * *